US012693971B2

(12) United States Patent
Chen

(10) Patent No.: US 12,693,971 B2
(45) Date of Patent: Jul. 28, 2026

(54) NON-VOLATILE MEMORY CONTROLLER, CONTROL METHOD, AND NON-TRANSITORY COMPUTER-READABLE STORAGE MEDIUM

(71) Applicant: Silicon Motion, Inc., Jhubei City (TW)

(72) Inventor: Yu-Ta Chen, Keelung City (TW)

(73) Assignee: SILICON MOTION, INC., Jhubei City (TW)

( * ) Notice: Subject to any disclaimer, the term of this patent is extended or adjusted under 35 U.S.C. 154(b) by 55 days.

(21) Appl. No.: 18/932,799

(22) Filed: Oct. 31, 2024

(65) Prior Publication Data

US 2025/0156315 A1 May 15, 2025

(30) Foreign Application Priority Data

Nov. 14, 2023 (TW) ................................. 112143853

(51) Int. Cl.
*G06F 12/02* (2006.01)

(52) U.S. Cl.
CPC .. *G06F 12/0246* (2013.01); *G06F 2212/7201* (2013.01); *G06F 2212/7205* (2013.01)

(58) Field of Classification Search
CPC ......... G06F 12/0246; G06F 2212/7201; G06F 2212/7205; G06F 2212/1044; G06F 2212/7204; G06F 2212/7209
See application file for complete search history.

(56) References Cited

U.S. PATENT DOCUMENTS

| | | | | |
|---|---|---|---|---|
| 9,280,459 B2 * | 3/2016 | Su | ....................... | G06F 12/0253 |
| 10,152,426 B2 | 12/2018 | Yeh | | |
| 10,545,876 B2 | 1/2020 | Su | | |
| 10,754,786 B2 * | 8/2020 | Lai | ..................... | G06F 12/1009 |
| 11,455,245 B2 | 9/2022 | Duan | | |
| 11,494,102 B2 | 11/2022 | Malshe | | |
| 11,809,312 B2 | 11/2023 | Yang | | |
| 2015/0026389 A1 * | 1/2015 | Li | ...................... | G06F 12/0246 |
| | | | | 711/103 |
| 2016/0321172 A1 * | 11/2016 | Jinzenji | ............... | G06F 12/0246 |
| 2017/0075600 A1 * | 3/2017 | Jung | .................. | G06F 12/0253 |
| 2021/0216447 A1 * | 7/2021 | Fu | ........................ | G06F 12/0822 |
| 2022/0197790 A1 * | 6/2022 | Palmer | ............... | G06F 12/0891 |
| 2022/0405199 A1 | 12/2022 | Kanno | | |

FOREIGN PATENT DOCUMENTS

| | | | |
|---|---|---|---|
| TW | I782654 B | 11/2022 | |

* cited by examiner

*Primary Examiner* — Michael Alsip
(74) *Attorney, Agent, or Firm* — McClure, Qualey & Rodack, LLP

(57) ABSTRACT

Garbage collection technology for non-volatile memory is shown. Space allocation of the non-volatile memory is presented by a plurality of logical-to-physical address mapping sub-tables. The processor selects a plurality of source blocks and a destination block from the non-volatile memory for garbage collection. In order from the lowest to the highest logical address, the processor selects the logical-to-physical address mapping sub-tables in turn for use as a scan target, to perform a full scan of each logical-to-physical address mapping sub-table. In this way it identifies valid data in the source blocks, collects the valid data obtained from the source blocks, and programs the valid data to the destination block.

11 Claims, 8 Drawing Sheets

NON-VOLATILE MEMORY CONTROLLER, CONTROL METHOD, AND NON-TRANSITORY COMPUTER-READABLE STORAGE MEDIUM

CROSS REFERENCE TO RELATED APPLICATIONS

This Application claims priority of Taiwan Patent Application No. 112143853, filed on Nov. 14, 2023, the entirety of which is incorporated by reference herein.

BACKGROUND OF THE INVENTION

Field of the Invention

The present invention relates to control technology for a non-volatile memory.

Description of the Related Art

There are various forms of non-volatile memory used for long-term data storage, such as flash memory, magnetoresistive random access memory (magnetoresistive RAM), ferroelectric RAM, resistive RAM, spin transfer torque-RAM (STT-RAM), and so on. These types of non-volatile memory may be used as the storage medium in a data storage device.

In this technical field, how to efficiently control non-volatile memory is an important issue.

BRIEF SUMMARY OF THE INVENTION

A non-volatile memory controller in accordance with an exemplary embodiment of the disclosure includes a communication interface, and a processor. The communication interface is coupled to a non-volatile memory. The space allocation of the non-volatile memory is presented by a plurality of logical-to-physical address mapping sub-tables. The processor selects a plurality of source blocks and a destination block from the non-volatile memory for garbage collection. In order from the lowest to the highest logical address, the processor selects the logical-to-physical address mapping sub-tables in turn for use as a scan target, to perform a full scan of each logical-to-physical address mapping sub-table, and thereby to identify valid data in the source blocks and program the valid data obtained from the source blocks to the destination block.

The garbage collection procedure performed by such a non-volatile memory controller not only makes good use of the downloaded logical-to-physical address mapping sub-table, but also quickly clear the starting source block. The efficiency of garbage collection is greatly improved.

In an exemplary embodiment, the processor scans the scan target on a mapping management unit basis, to obtain a mapped physical address mapped to a target logical address. When the mapped physical address leads to one of the source blocks, the processor collects data indicated by the mapped physical address, and the processor programs the data it has collected to the destination block.

Based on the proposed concept of optimized garbage collection, a method for controlling a non-volatile memory is shown.

In an exemplary embodiment, a computer program product storing program code to be executed by a processor to implement the disclosed non-volatile memory control method is shown.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description enumerates various embodiments of the disclosure, but is not intended to be limited thereto. The actual scope of the disclosure should be defined according to the claims. The various blocks and modules mentioned below may be implemented by a combination of hardware, software, and firmware, and may also be implemented by special circuits. The various blocks and modules are not limited to being implemented separately, but can also be combined together to share certain functions.

A non-volatile memory for long-term data retention may be a flash memory, a magnetoresistive random access memory (magnetoresistive RAM), a ferroelectric RAM, a resistive RAM, a spin transfer torque-RAM (STT-RAM) and so on. The following discussion uses flash memory as an example, but is not limited thereto. The proposed technology may be applied to the other types of non-volatile memory.

Today's data storage devices often use flash memory as the storage medium for storing user data from the host. There are many types of data storage devices, including memory cards, universal serial bus (USB) flash devices, solid-state drives (SSDs), Universal Flash Storage (UFS) devices, and so on. In another exemplary embodiment, a flash memory may be packaged with a controller to form a multiple-chip package called eMMC (embedded multimedia card).

A data storage device using a flash memory as a storage medium can be applied in a variety of electronic devices, including a smartphone, a wearable device, a tablet computer, a virtual reality device, etc. A processor of an electronic device may be regarded as a host that operates the data storage device equipped on the electronic device to access the flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

The vehicle-mounted device may also use a flash memory for data storage. Various sensors in the vehicle system each may be regarded as a host end, which has a need to access the flash memory.

A flash memory has its special storage characteristics. The host indicates logical addresses (for example, logical block address LBA or global host page number GHP, etc.) to issue read or write requests to the flash memory. The logical addresses need to be mapped to physical addresses of the physical space of the flash memory.

Figure 1:
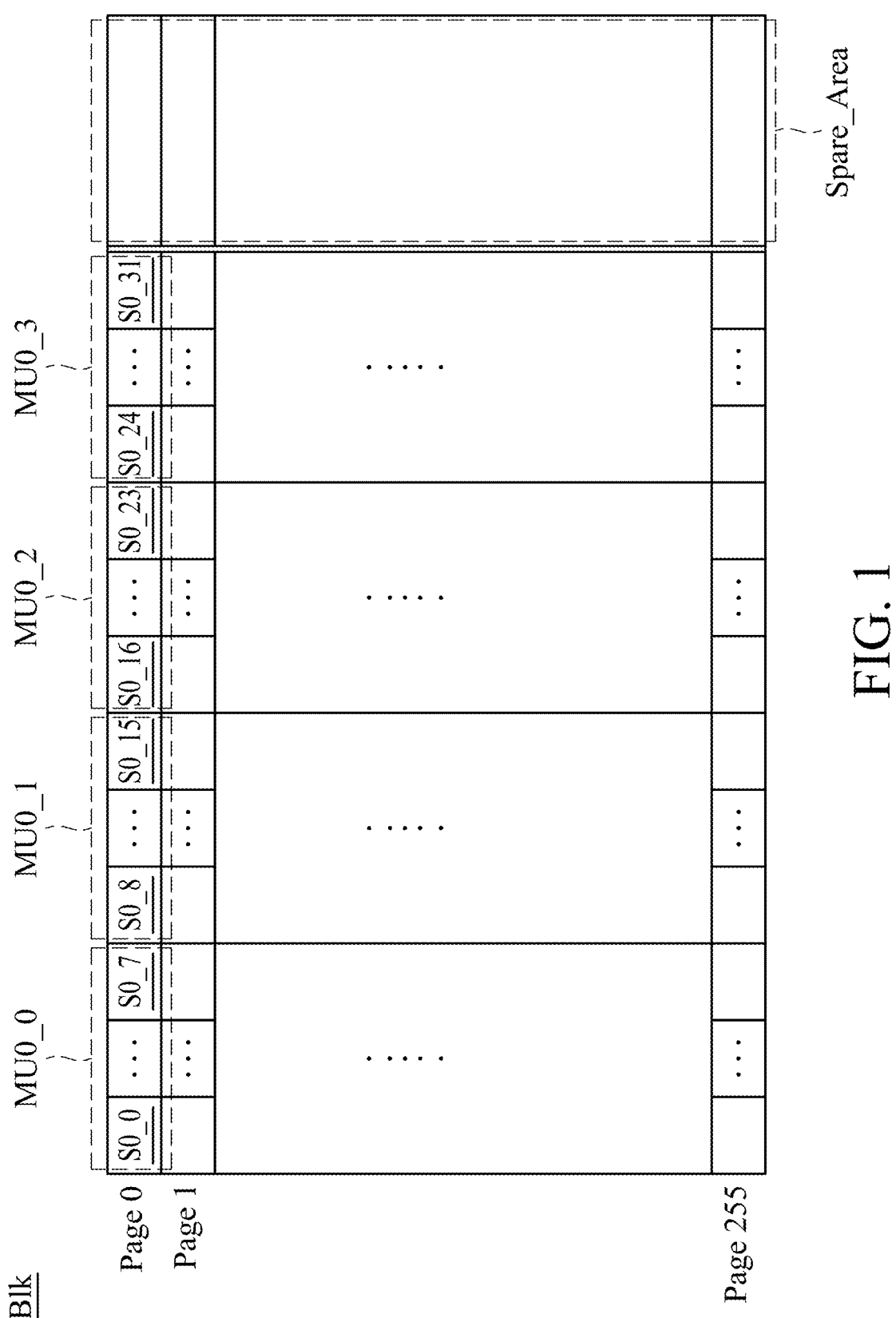
FIG. 1 illustrates the structure of a physical block Blk of flash memory.

The physical space of a flash memory is divided into a plurality of physical blocks for storage. FIG. 1 illustrates the structure of a physical block Blk of flash memory.

A physical block Blk includes a plurality of physical pages; for example, page 0 . . . page 255. Each physical page includes a plurality of physical sectors; for example, page 0 includes 32 physical sectors S0_0 . . . S0_31. Each physical sector may store 512B of user data, and one physical page therefore can provide a storage space of 16 KB. In an exemplary embodiment, the storage space of each physical block Blk is programmed in order of the page number, e.g., from the low number (page 0) to the high number (page 255). In some exemplary embodiments, a multi-channel technology is applied to greatly improve the data throughput. The physical blocks accessed in parallel through the different channels form a super block. Physical pages with the same number in the different physical blocks of a super block form a super pages. According to the multi-channel technology, the storage space of a super block may be programmed according to the super page number from low to high. The physical block referred to in some exemplary embodiments is the super block. In this disclosure, it is not intend to limit the size of the blocks, pages, and sectors. The following description based on a storage device of a specific size is for convenience of discussion only.

In an exemplary embodiment, each physical sector (512B) is mapped to a logical block address LBA. Taking a 4 KB mapping mode as an example, eight consecutive 512B physical sectors (such as S0_0 . . . S0_7) form a 4 KB space that is a mapping management unit (such as MU0_0). Each mapping management unit (MU0_0) corresponds to the data storage of eight consecutive logical block addresses (8 LBAs), that is indicated by a global host page number (GHP). The four mapping management units MU0_0, MU0_1, MU0_2, and MU0_3 (4×4 KB in size, accounting for 16 KB) of one physical page therefore correspond to four GHPs. As shown in FIG. 1, the physical block Blk includes a spare area Spare_Area, which is formed by the spare space at the end of each physical page and stores meta data. For each page, the four GHPs of the four mapping management units are recorded in the spare space of the page. In an exemplary embodiment, each 4 KB mapping management unit is indicated by 4B GHP. The GHPs are recorded in the GHP entries of the spare area Spare_Area to show the physical-to-logical address mapping relationship.

In addition to being recorded in the spare area Spare_Area, the GHPs mapped to the whole physical block Blk can be collected to form a physical-to-logical address mapping table (or, a flash-to-host mapping table F2H), which is recorded as end-of-block information (EoB for short) in the final page 255 of the physical block Blk. In another exemplary embodiment, the physical-to-logical address mapping table (F2H) may be stored in a system block in the flash memory that stores system information.

The complex mapping relationship between the physical space and the logical address is tracked by the GHPs record in the spare area Spare_Area or the EoB.

In particular, a flash memory has an important characteristic that the storage space must be erased in units of physical blocks before being reused to store data. The updated data is not overwritten onto the old data. The new version of data must be written into a spare space, and then the old data is invalidated. Therefore, several physical addresses may be mapped to the same logical address.

Thus, the spatial allocation of flash memory is quite complex. In an exemplary embodiment, in addition to the aforementioned physical-to-logical address mapping information (for example, the 4B GHP recorded for each 4 KB mapping management unit), a logical-to-physical address mapping table (e.g., a host-to-flash mapping table H2F) is proposed. In order from the lowest to highest logical address, an H2F table shows how the GHPs are mapped to the physical addresses of the flash memory. The logical-to-physical address mapping table H2F is generally stored in the system block of the flash memory and must be downloaded from the flash memory into the controller's memory (such as a DRAM or SRAM) to be read or updated.

However, with the development of the manufacturing processes, the size of flash memory is getting larger and larger. For a 4 TB flash memory, the logical-to-physical address mapping table H2F is up to 4 GB. For an 8 TB flash memory, the logical-to-physical address mapping table H2F is up to 8 GB. The excessively large logical-to-physical address mapping table H2F is not easy to manage.

One solution is to divide the large logical-to-physical address mapping table H2F into small logical-to-physical address mapping sub-tables; for example, each logical address group G# (# is the number) corresponds to one logical-to-physical address mapping sub-table H2F_G#. In an exemplary embodiment, each logical-to-physical address mapping sub-table H2F_G# contains mapping information related to 1K GHPs, and the size of H2F_G# is 4 KB (i.e., 1K×4B, exactly the size of one mapping management unit). Only the called logical-to-physical address mapping sub-table H2F_G# is downloaded from the flash memory to the controller's memory for reference or update. Compared with downloading the whole logical-to-physical address mapping table H2F, downloading just the required logical-to-physical address mapping sub-table H2F_G# only consumes a small amount of system resources.

Furthermore, as the aforementioned flash memory characteristics, the storage space must be erased in units of blocks before being reused, and thereby valid data may be sporadically retained in many physical blocks, so that these physical blocks sporadically store valid data cannot be released as spare blocks. In gradually consumes the spare blocks. When the number of spare blocks is insufficient (for example, less than a threshold), garbage collection is required. The scattered valid data retained in a source block are collected into a destination block through garbage collection. The source block with only invalid data therefore can be released to increase the number of spare blocks and ensure the normal use of the flash memory.

Figure 2:
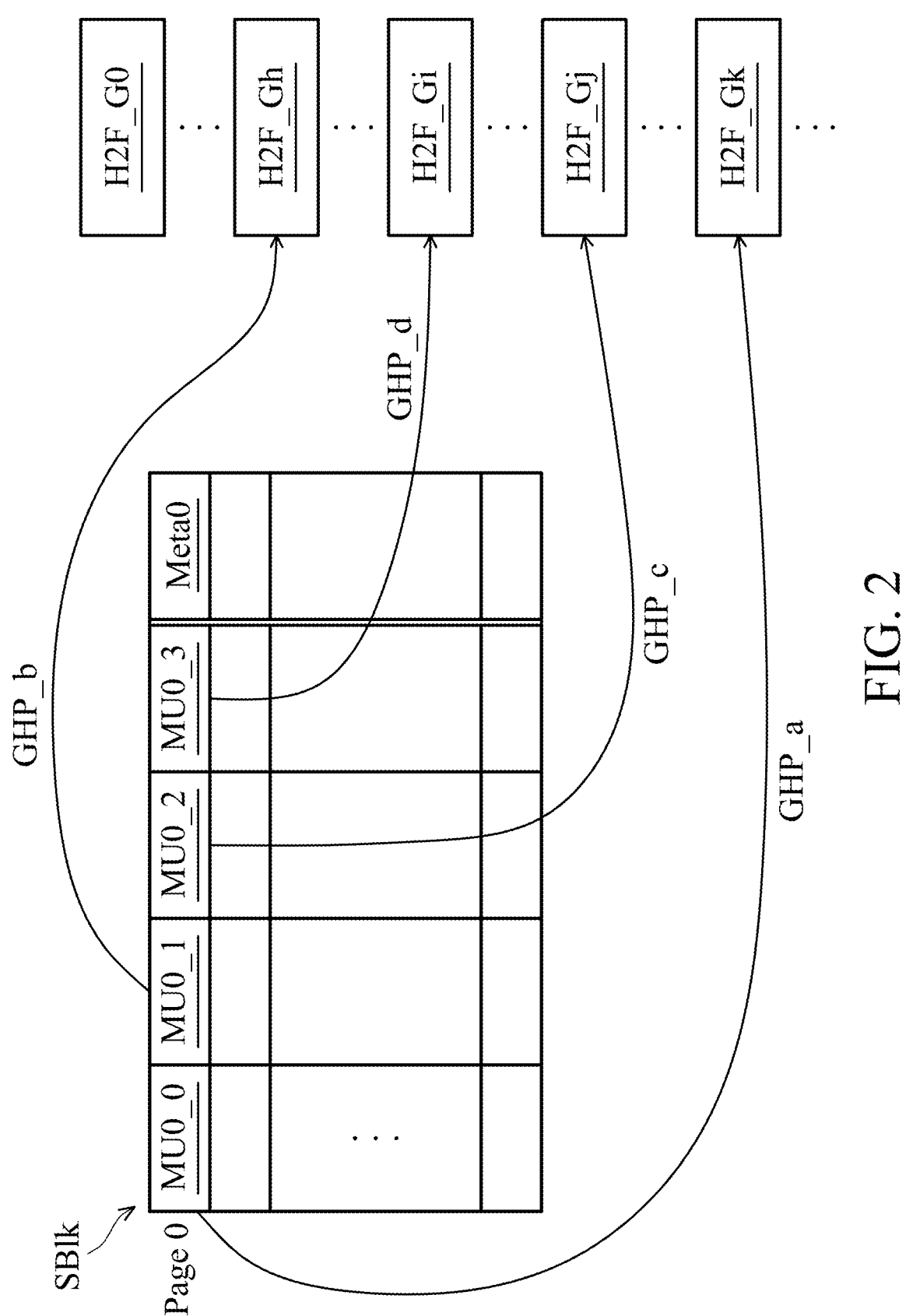
FIG. 2 illustrates the valid data determination performed on a source block SBLK.

Garbage collection (GC) also needs to refer to the logical-to-physical address mapping sub-tables H2F_G#. FIG. 2 illustrates the valid data determination performed on a source block SBLK, wherein the four mapping management units MU0_0, MUG_1, MUG_2, and MUG_3 of page 0 are presented as an example. As recorded in the metadata Meta0, the four mapping management units MUG_0, MUG_1, MUG_2, and MUG_3 correspond to four global host page numbers GHP_a, GHP_b, GHP_c, and GHP_d (a, b, c, and d represent four very different numbers). The four global host page numbers GHP_a, GHP_b, GHP_c, and GHP_d relate to four different logical groups Gk, Gh, Gj, and Gi, respectively, and correspond to four logical-to-physical address mapping sub-tables H2F_Gk, H2F_Gh, H2F_Gi, and H2F_Gj. The valid data determination of page 0 of the source block SBLK needs to download the four logical-to-physical address mapping sub-table H2F_Gk, H2F_Gh, H2F_Gi, and H2F_Gj in turn (4 times of downloading is required). Taking the logical-to-physical address mapping sub-table H2F_Gk as an example, it is looked up according to the global host page number GHP_a, and a mapped physical address is obtained. If the mapped physical address indeed points to the mapping management unit MUG_0 of the source block SBLK, it means that the data stored in the mapping management unit MUG_0 is valid; otherwise, the data stored in the mapping management unit MUG_0 is invalid. Conventional garbage collection methods demonstrate that repeatedly downloading the logical-to-physical address mapping sub-tables H2F_Gk, H2F_Gh, H2F_Gi, and H2F_Gj consumes considerable computing resources.

This disclosure proposes a novel garbage collection technology, which makes good use of the downloaded logical-to-physical address mapping sub-tables H2F_G#. Before downloading the next logical-to-physical address mapping sub-table, the current logical-to-physical address mapping sub-table is fully scanned to identify and collect a large amount of valid data and program it to the destination block. In this manner, by simply downloading a few logical-to-physical address mapping sub-tables H2F_G#, a destination block is filled full of valid data. In particular, because the valid data collected and programmed to the destination block are obtained by performing a full scan of the logical-to-physical address mapping sub-table H2F_G#, the destination block can easily collect data containing sequential logical addresses. This makes reading more efficient. In comparison, conventional garbage collection generally collects non-sequential data and programs it to a destination block. By such a garbage collection procedure, the device gradually changes to store data in a non-sequential manner, and the reading speed is slowed down.

In particular, to release storage space more efficiently, some exemplary embodiments of the disclosure are designed to perform garbage collection on the blocks with just a few valid data. In this manner, it is easy to invalidate and release the entire source block.

Figure 3:
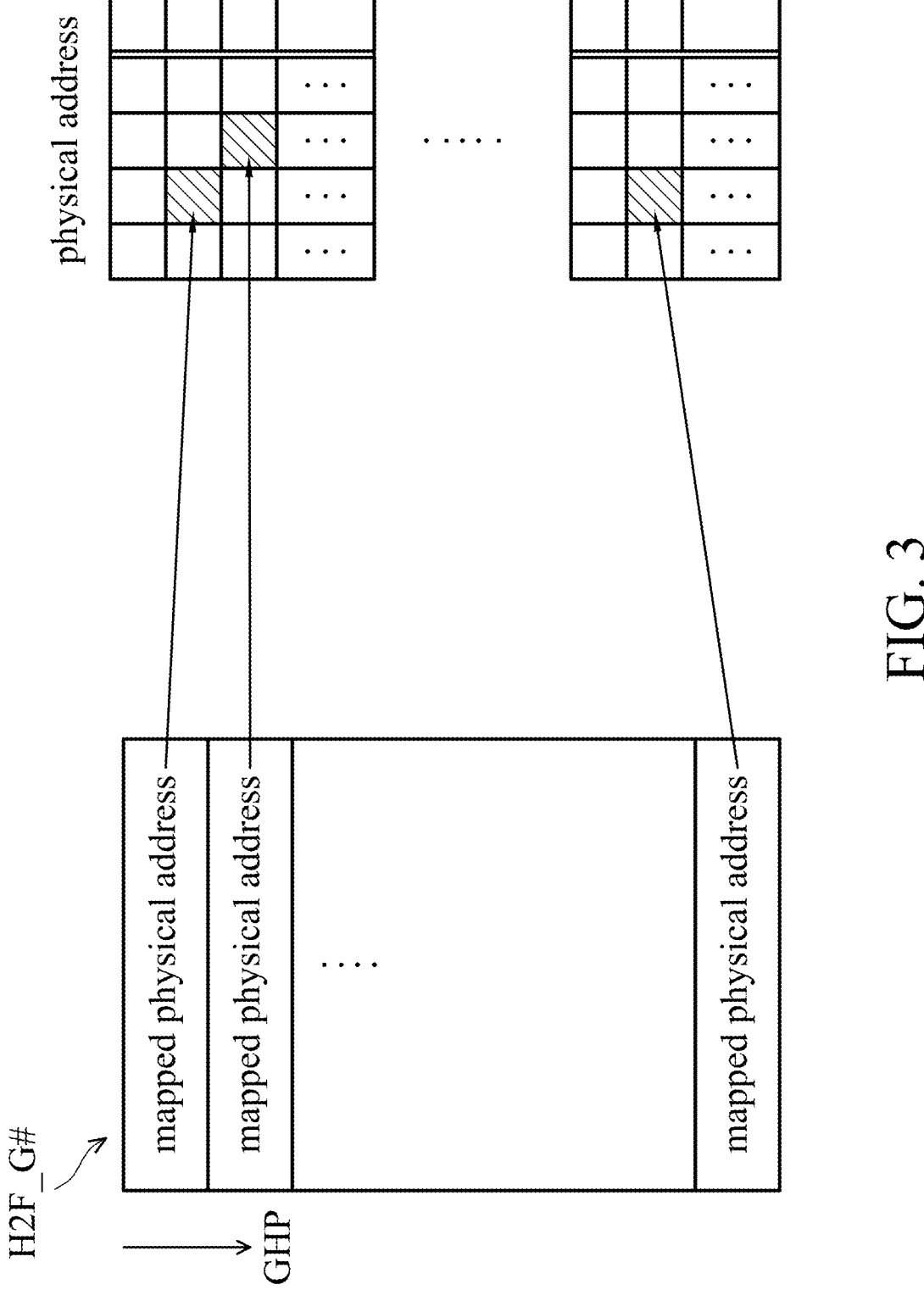
FIG. 3 illustrates the method for scanning a logical-to-physical address mapping sub-table H2F_G#.

FIG. 3 illustrates the method for scanning a logical-to-physical address mapping sub-table H2F_G#, by which the logical-to-physical address mapping sub-table H2F_G# is scanned in order from the lowest to the highest GHP (each GHP corresponds to a 4 KB mapping management unit of data, and such the full scan is one mapping management unit after another, which is on the mapping management unit basis). According to the mapped physical address of each target logical address (GHP), valid data scattered in the physical blocks is collected. In this disclosure, only the valid data in the source block is collected. The valid data in the other blocks (other than the source blocks) is ignored. The source blocks, therefore, are easily cleared and released in the garbage collection procedure.

Figure 4:
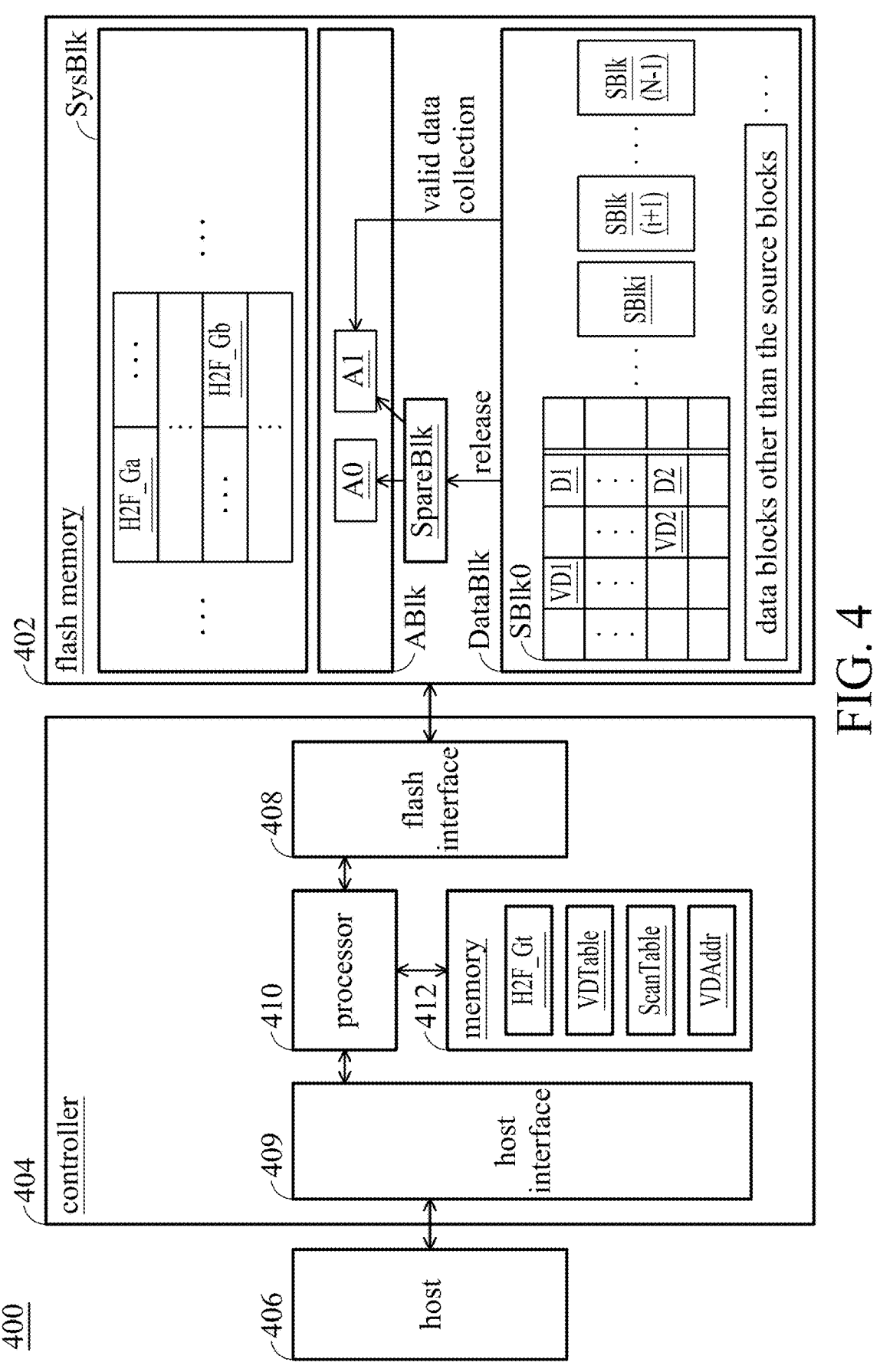
FIG. 4 illustrates an electronic system 400 in accordance with an exemplary embodiment of the disclosure.

FIG. 4 illustrates an electronic system 400 in accordance with an exemplary embodiment of the disclosure, including a flash memory 402 that is a storage medium implementing a data storage device, a controller 404, and a host 406 that operates the data storage device. The controller 404 includes a flash interface 408 coupled to the flash memory 402, a host interface 409 coupled to the host 406, and a processor 410 operating the flash memory 402 through the flash memory interface 408. The host 406 accesses the flash memory 402 through the controller 404. The flash memory interface 408 is designed for the flash memory 402. If the flash memory 402 is replaced by other types of storage media, the communication interface is adaptively changed. The flash memory interface 408 and the flash memory 402 may communicate with each other through a Double Data Rate (DDR) communication protocol, such as an Open NAND Flash Interface (ONFI), a Double Data Rate (DDR) Toggle interface, or the other communication interfaces. The controller 404 may use a Universal Serial Bus (USB), an advanced technology attachment (ATA) bus, a serial advanced technology attachment (SATA) bus, a peripheral component interconnect express (PCI-E) bus, a Universal Flash Storage (UFS) bus, or an Embedded Multi-Media Card (eMMC) bus as the host interface 409, to communicate with the host 406.

The flash memory 402 may include a system block pool SysBlk, a data block pool DataBlk, a spare block pool SpareBlk, and an active block pool ABlk. The logical-to-physical address mapping sub-tables H2F_G# are stored in the system block pool SysBlk. User data is stored in the data block pool DataBlk. There is no valid data in the spare block pool SpareBlk, and the physical blocks in the spare block pool SpareBlk may be selected for erasure and be pushed into the active block pool ABlk. The active block pool ABlk includes a write block A0 for programming of write data issued by the host 406, and a destination block A1 for collection of valid data obtained in a garbage collection (GC) procedure.

As shown, the controller 404 further includes a memory (DRAM or SRAM) 412. A target logical-to-physical address mapping sub-table H2F_Gt is read from the system block pool SysBlk and loaded into the memory 412 of the controller 404 as a scan target. The novel garbage collection technology of the disclosure is achieved by performing a full scan of the scan target H2F_Gt. According to this garbage collection design, the processor 410 updates a valid data count table VDTable, a scan flag table ScanTable, and an address tag VDAddr on the memory 412.

The valid data count table VDTable records for each physical block the total number of mapping management units (4 KB units) that store valid data. In an exemplary embodiment, the valid data count table VDTable is usually stored in a block in the system block pool SysBlk, and is loaded to the controller's memory 412 to be updated in accordance with the changes on the logical-to-physical mapping table H2F. The processor 410 obtains the valid data count of each physical block according to the valid data count table VDTable and, accordingly, selects the source blocks (SBlk) from the data block pool DataBlk for garbage collection.

In an exemplary embodiment, the N physical blocks with the lowest valid data counts are selected as the source blocks (SBlk), where N is a positive integer (such as 16), and these source blocks (SBlk) are numbered from the lowest valid data count to the highest valid data count: SBlk0 . . . SBlk(N−1). The source block SBlk0 with the lowest valid data count is the starting source block.

The processor 410 starts the valid data determination (referring to the description of FIG. 2) from the starting source block SBlk0. When the first valid data VD1 in the starting source block SBlk0 is identified, the processor 410 records the physical address of the first valid data VD1 as an address tag VDAddr. The processor 410 regards a first logical-to-physical address mapping sub-table H2F_Ga corresponding to the first valid data VD1 as a scan target (labeled H2F_Gt), and performs a full scan (referring to the description of FIG. 3) on the scan target H2F_Gt. Because the scan target H2F_Gt (i.e. H2F_Ga) is downloaded from the system block pool SysBlk into the memory 412 when the valid data VD1 is identified, the full scan is performed on the scan target H2F_Gt (i.e. H2F_Ga) already stored in the memory 412, and thereby no redundant downloading is required. The processor 410 scans the scan target H2F_Gt (i.e. H2F_Ga) on a mapping management unit basis, to obtain a mapped physical address of each mapping management unit. When the mapped physical address leads to the source blocks SBlk0 . . . SBlk(N−1), the processor 410 collects the valid data indicated by the mapped physical address into the destination block A1. The processor 410 may check and update the valid data count table VDTable during the collection of valid data. When moving valid data to the destination block A1, the valid data count of the corresponding source block SBlk is decreased and updated to the valid data count table VDTable. According to the valid data count table VDTable, the processor 410 may exclude the blocks with no valid data from the monitored source blocks (SBlk), to be released to the spare block pool SpareBlk for reuse.

The scan flag table ScanTable is used to manage a scan flag for each logical-to-physical address mapping sub-table H2F_G#. Each scan flag shows whether a full scan of the corresponding logical-to-physical address mapping sub-table H2F_G# is finished or not. Based on the scan flags, the logical-to-physical address mapping sub-tables H2F_G# with finished full scan are excluded from the following valid data determination procedure. When finishing a full scan of the first logical-to-physical address mapping sub-table H2F_Ga, the processor 410 asserts the scan flag corresponding to the first logical-to-physical address mapping sub-table H2F_Ga in the scan flag table ScanTable. In the subsequent valid data determination, the data obtained from the source blocks (SBlk) mapped to the logical address range of H2F_Ga can be directly identified as invalid data (because its valid version has previously been collected and programmed to the destination block A1). Thus, there is no need to download the first logical-to-physical address mapping sub-table H2F_Ga into the memory 412 again. In an example, the data D1 of the starting source block SBlk0 corresponds to the first logical-to-physical address mapping sub-table H2F_Ga that has been scanned. Based on the asserted flag corresponding to the first logical-to-physical address mapping sub-table H2F_Ga in the scan flag table ScanTable, the processor 410 directly determines that the valid version of the data D1 has been indeed collected and programmed to the destination block A1. There is no need to download the first logical-to-physical address mapping sub-table H2F_Ga to the memory 412 again to determine whether the data D1 is valid or not.

As indicated by the address tag VDAddr, the processor 410 continues the valid data determination (considering the scan flag table ScanTable) from the mapping management unit following the first valid data VD1 in the starting source block SBlk0 to identify the second valid data VD2 that has not yet been collected and programmed to the destination block A1.

The processor 410 updates the address tag VDAddr with the physical address of the second valid data VD2 in the staring source block SBlk0, and uses the second logical-to-physical address mapping sub-table H2F_Gb that corresponds to the second valid data VD2 as the scan target H2F_Gt. Similarly, the scan target H2F_Gt (i.e. H2F_Gb) is downloaded from the system block pool SysBlk into the memory 412 when the valid data VD2 is identified. By regarding the second logical-to-physical address mapping sub-table H2F_Gb as the scan target H2F_Gt, a full scan can be performed on the second logical-to-physical address mapping sub-table H2F_Gb that is already stored in the memory 412, and thereby no redundant downloading is required. If the valid data identified by the full scan (referring to the description of FIG. 3) of the scan target H2F_Gt (i.e. H2F_Gb) is in the source blocks SBlk0 . . . SBlk(N−1), the processor 410 collects the identified valid data and programs it to the destination block A1 and, accordingly, updates the valid data count table VDTable. Based on the valid data count table VDTable, the blocks without any valid data are deleted from the source blocks (SBlk) and pushed into the spare block pool SpareBlk.

After a full scan of the second logical-to-physical address mapping sub-table H2F_Gb is completed, the processor 410 asserts the scan flag corresponding to the second logical-to-physical address mapping sub-table H2F_Gb in the scan flag table ScanTable. Accordingly, the data (e.g. D2) mapped to the logical address range of the second logical-to-physical address mapping sub-table H2F_Gb is regarded as invalid data (whose valid version has been collected and programmed to the destination block A1). There is no need to download the second logical-to-physical address mapping sub-table H2F_Gb to the controller's memory 412 again.

In an exemplary embodiment, after the logical-to-physical address mapping sub-tables H2F_G# related to the starting source block SBlk0 are all scanned, the valid data in the starting source block SBlk0 is collected completely and programmed to the destination block A1. The processor 410 may check the dynamically updated valid data count table VDTable to select the source block with the lowest valid data count to perform the subsequent valid data determination thereon. Accordingly, a logical-to-physical address mapping sub-table is selected as the next scan target H2F_Gt to be scanned from the first mapping management unit to the final mapping management unit.

Because the scan target H2F_Gt is related to the blocks with the lowest valid data counts, it is conducive to quickly clear the small amount of valid data remained in these blocks. Thus, these blocks can be easily released to the spare block pool SpareBlk. This design will also speed up the garbage collection.

In an exemplary embodiment, the processor 410 ranks the source blocks SBlk0 . . . SBlk(N−1) from low to high valid data counts. The source blocks are divide into two groups: the primary clearing blocks SBlk0 . . . SBlki (with the lowest valid data counts); and the secondary clearing blocks SBlk(i+1) . . . SBlk(N−1) (with the highest valid data counts). The total amount of valid data (hereinafter labeled VDtotal) of the all primary clearing blocks SBlk0 . . . SBlki does not exceed a tolerance value that is defined by the spare space size (hereinafter labeled SizeA1) of the destination block A1. For example, if the spare space size SizeA1 of the destination block A1 is 4 MB, the total amount of valid data in the source blocks SBlk0 . . . SBlki is 3.2 MB, and the total amount of valid data in the source blocks SBlk0 . . . SBlk(i+1) is 4.2 MB, the processor 410 may rank the source blocks SBlk0 . . . SBlki as the primary clearing blocks, and the source blocks SBlk(i+1) . . . SBlk(N−1) as the secondary clearing blocks. The processor 410 prioritizes the valid data collection about the primary clearing blocks SBlk0 . . . SBlki over the valid data collection about the secondary clearing blocks SBlk(i+1) . . . SB1(N–1).

In the other exemplary embodiments, the ranking rule of the primary clearing blocks and the secondary clearing blocks may be modified, but the core concept is still that the primary clearing blocks have the higher priority to be cleared than the secondary clearing blocks.

In an exemplary embodiment, the processor 410 calculates the difference between the total amount VDtotal of valid data in the primary clearing blocks SBlk0 . . . SBlki and the spare space size SizeA1 of the destination block A1, and uses the calculated difference to initialize a residual value (hereinafter labeled Diff). When collecting valid data from the secondary clearing blocks SBlk(i+1) . . . SB1(N–1) to be programmed to the destination block A1, the processor 410 decreases the residual value Diff. When the residual value Diff decreases to a threshold value (such as 0), the processor 410 stops collecting and moving valid data from the secondary clearing blocks SBlk(i+1) . . . SB1(N–1) to the destination block A1, and only valid data stored in the primary clearing blocks SBlk0 . . . SBlki are allowed to be collected and programmed to the destination block A1. In this manner, the primary clearing blocks SBlk0 . . . SBlki have a higher priority to be cleared and released than the secondary clearing blocks SBlk(i+1) . . . SB1(N–1).

Figure 5:
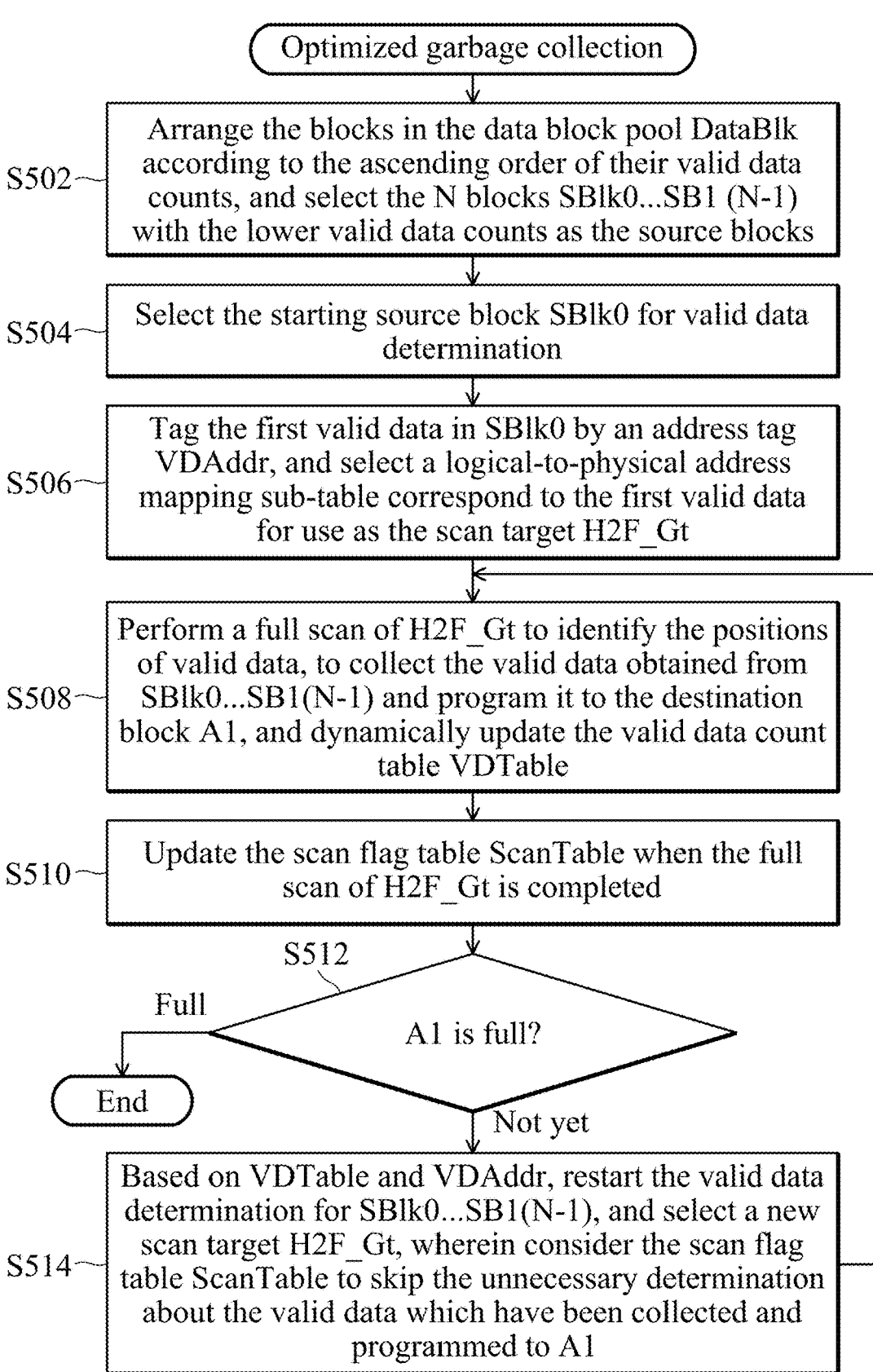
FIG. 5 is a flow chart illustrating an optimized garbage collection procedure in accordance with an exemplary embodiment of the disclosure.

FIG. 5 is a flow chart illustrating an optimized garbage collection procedure in accordance with an exemplary embodiment of the disclosure.

In step S502, the blocks in the data block pool DataBlk are arranged according to the ascending order of their valid data counts, and the N blocks SBlk0 . . . SB1 (N–1) with the lowest valid data counts are selected as the source blocks.

Step S504 selects the starting source block SBlk0 for valid data determination (referring to description of FIG. 2).

Step S506 tags the first valid data in the starting source block SBlk0 by an address tag VDAddr, and a logical-to-physical address mapping sub-table correspond to the first valid data is selected for use as the scan target H2F_Gt.

Step S508 performs a full scan of the scan target H2F_Gt to identify the positions of valid data, to collect the valid data obtained from the source blocks SBlk0 . . . SB1(N–1) and program it to the destination block A1, and to dynamically update the valid data count table VDTable.

Step S510 updates the scan flag table ScanTable when the full scan of the scan target H2F_Gt is completed.

In step S512, it is determined whether the destination block A1 is full. If so, the flow ends. If not, the flow proceeds to step S514. Based on the valid data count table VDTable and the address tag VDAddr, the valid data determination for the source blocks SBlk0 . . . SB1(N–1) restarts, and a new scan target H2F_Gt is selected. The scan flag table ScanTable is also considered in step S514. Based on the scan flag table ScanTable, the unnecessary determination about the valid data which have been collected and programmed to the destination block A1 is not required. Then, the procedure returns to step S508 to perform the valid data determination by performing a full scan of the newly selected scan target H2F_Gt.

Figure 6:
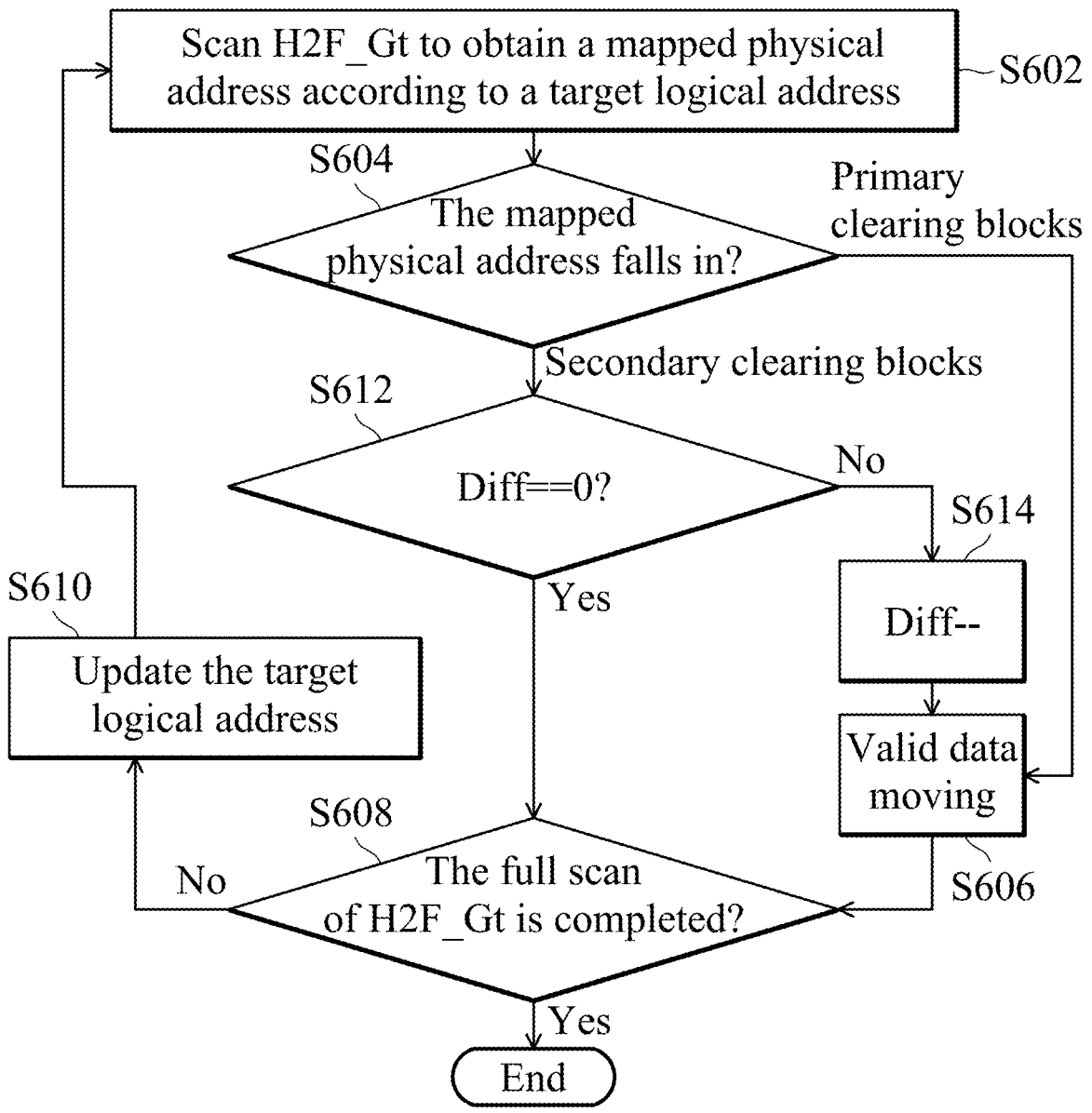
FIG. 6 is a flow chart illustrating the optimized garbage collection procedure performed on the primary clearing blocks SBlk0 . . . SBlki and the secondary clearing blocks SBlk(i+1) . . . SB1(N−1)

FIG. 6 is a flow chart illustrating the optimized garbage collection procedure performed on the primary clearing blocks SBlk0 . . . SBlki and the secondary clearing blocks SBlk(i+1) . . . SB1(N–1).

In step S602, the scan target H2F_Gt is scanned. According to a target logical address, a mapped physical address is obtained from the scan target H2F_Gt. Step S604 determines where the mapped physical address leads to. If the mapped physical address leads to the primary clearing blocks SBlk0

. . . SBlki, the procedure proceeds to step S606 for valid data collection (collecting the valid data obtained from the primary clearing blocks SBlk0 . . . SBlki and programming it to the destination block A1). Step S608 determines whether the full scan of the scan target H2F_Gt is completed. If not, step S610 updates the target logical address, and the flow returns to step S602 to continue scanning the scan target H2F_Gt.

If step S604 determines that the mapped physical address leads to the secondary clearing block SBlk(i+1) . . . SB1 (N–1), the procedure proceeds to step S612 to determine whether the residual value Diff is 0. If not, step S614 decreases the residual value Diff, and step S606 performs the valid data collection (collecting the valid data obtained from the secondary clearing blocks SBlk(i+1) . . . SB1(N–1) and programming it to the destination block A1). Then, step S608 is performed to determine whether the full scan of the scan target H2F_Gt is completed.

If step S612 determines that the residual value Diff is 0, the collection of the obtained valid data is canceled, to stop collecting valid data from the secondary clearing blocks SBlk(i+1) . . . SB1(N–1) and programming it to the destination block A1. Then, step S608 is performed to determine whether the full scan of the scan target H2F_Gt is completed.

In another exemplary embodiment, it is not to start the valid data determination from the staring source block SBlk0. Instead, the scan target H2F_Gt is selected according the logical address. In order from the lowest to the highest logical address, the logical-to-physical address mapping sub-tables H2F_G# are selected in turn to serve as the scan target H2F_Gt.

Figure 7:
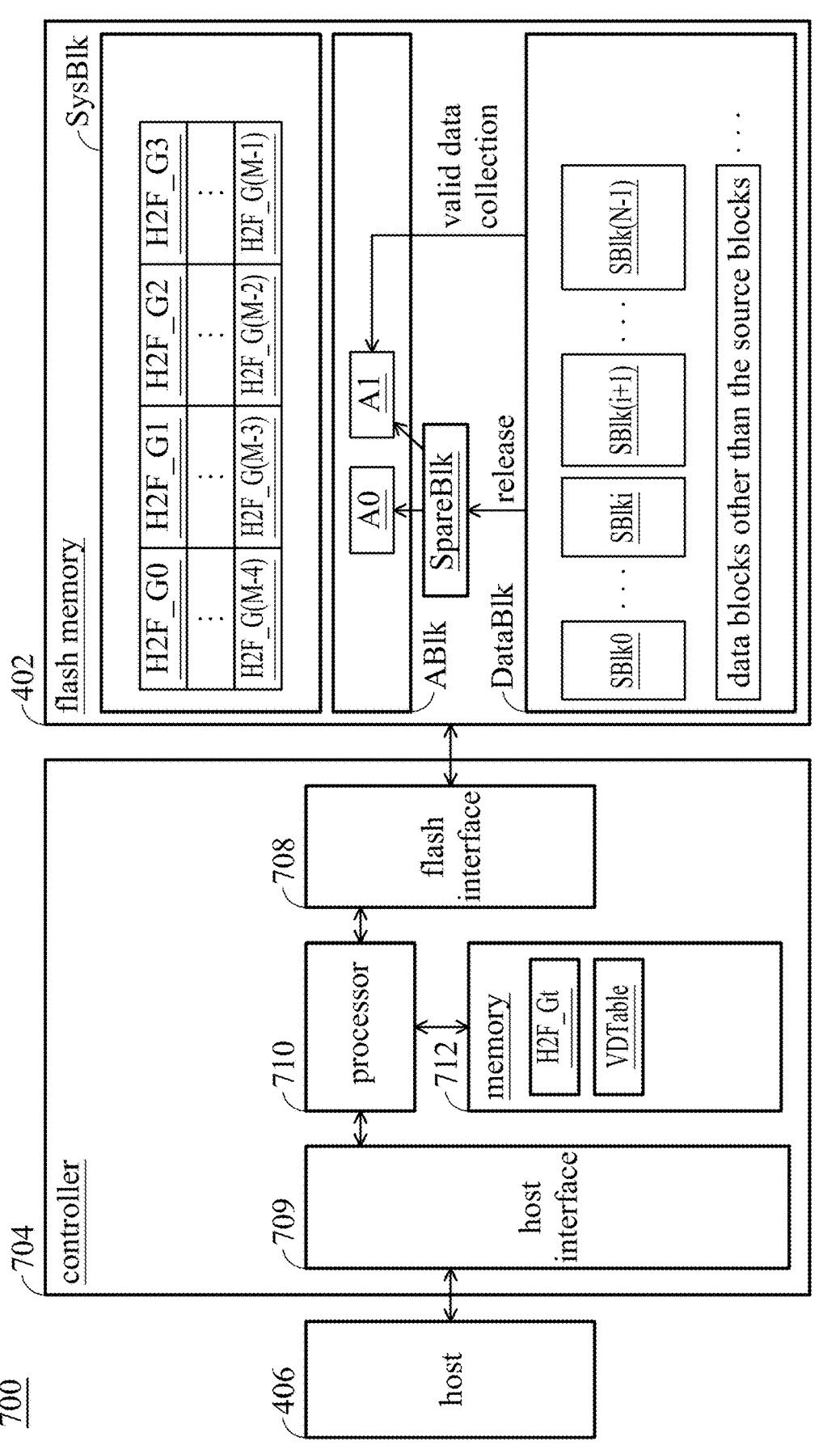
FIG. 7 shows an electronic system 700 in accordance with another exemplary embodiment of the disclosure.

FIG. 7 shows an electronic system 700 in accordance with another exemplary embodiment of the disclosure. Different from FIG. 4, the electronic system 700 implements the controller 704 in another way. The controller 704 includes a flash memory interface 708 coupled to the flash memory 402, a host interface 709 communicating with the host 406, a processor 710 operating the flash memory 402 through the flash memory interface 708, and a memory 712 utilized by the processor 710. The design of the processor 710 is different from the processor 410 in FIG. 4. The controller 704 downloads the logical-to-physical address mapping sub-table H2F_Gt to the memory (DRAM or SRAM) 712 for use as the scan target, and it downloads the valid data count table VDTable from the system block pool SysBlk to the memory 712 for dynamic update. However, compared with FIG. 4, there is no need to maintain the scan flag table ScanTable or the address tag VDAddr on the memory 712 of FIG. 7.

The valid data count table VDTable records for each physical block the total number of valid mapping management units (4 KB valid units). The processor 710 obtains the valid data count of each physical block according to the valid data count table VDTable and, accordingly, selects the source blocks (SBlk) from the data block pool DataBlk for garbage collection. In an exemplary embodiment, the N physical blocks with the lowest valid data counts are regarded as the source blocks (SBlk), where N is a positive integer (such as 16), and these source blocks (SBlk) are numbered from SBlk0 to SBlk(N–1) in order from the lowest to the highest valid data count.

In particular, the processor 710 is not limited to start the valid data determination from the source block SBlk0. The space utilization of the flash memory 402 shown in the figure is managed by M logical-to-physical address mapping sub-tables H2F_G0 . . . H2F_G(M–1), which respectively correspond to logical address groups G0 . . . G(M−1) in order from the lowest to the highest logical addresses (M is a positive integer). After selecting the source blocks SBlk0 . . . SBlk(N−1), the processor 710 downloads, according to the order from the lowest to the highest logical address groups G0 to G(M−1), the logical-to-physical address mapping sub-tables H2F_G0 . . . H2F_G(M−1) in turn, to set the scan target H2F_Gt. A full scan (referring to the description of FIG. 3) is performed on each scam target H2F_Gt. According to the mapping management unit basis, the processor 710 sequentially scans the logical-to-physical address mapping sub-table H2F_Gt to obtain a mapped physical address mapped of each scanned logical address. When any mapped physical address falls into the source blocks SBlk0 . . . SBlk(N−1), the processor 710 collects the valid data indicated by the mapped physical address to the destination block A1.

The processor 710 may check and update the valid data count table VDTable during the valid data collection. When collecting valid data to be programmed to the destination block A1, the valid data counts of the corresponding source blocks SBlk are decreased and updated to the valid data count table VDTable. According to the dynamically updated valid data count table VDTable, the processor 710 excludes the block with no valid data from the source blocks (SBlk), and releases it to the spare block pool SpareBlk.

In such a design, there is no need to scan the source blocks SBlk0 . . . SBlk(N−1). It saves considerable computing resources.

In an exemplary embodiment, the processor 710 also ranks the source blocks SBlk0 . . . SBlk(N−1) into primary clearing blocks SBlk0 . . . SBlki (with the lowest valid data counts) and secondary clearing blocks SBlk(i+1) . . . SBlk(N−1) (with the larger valid data counts). Based on the aforementioned concept of residual value Diff, The processor 710 prioritizes the valid data collection about the primary clearing blocks SBlk0 . . . SBlki over the valid data collection about the secondary clearing blocks SBlk(i+1) . . . SB1(N−1).

Figure 8:
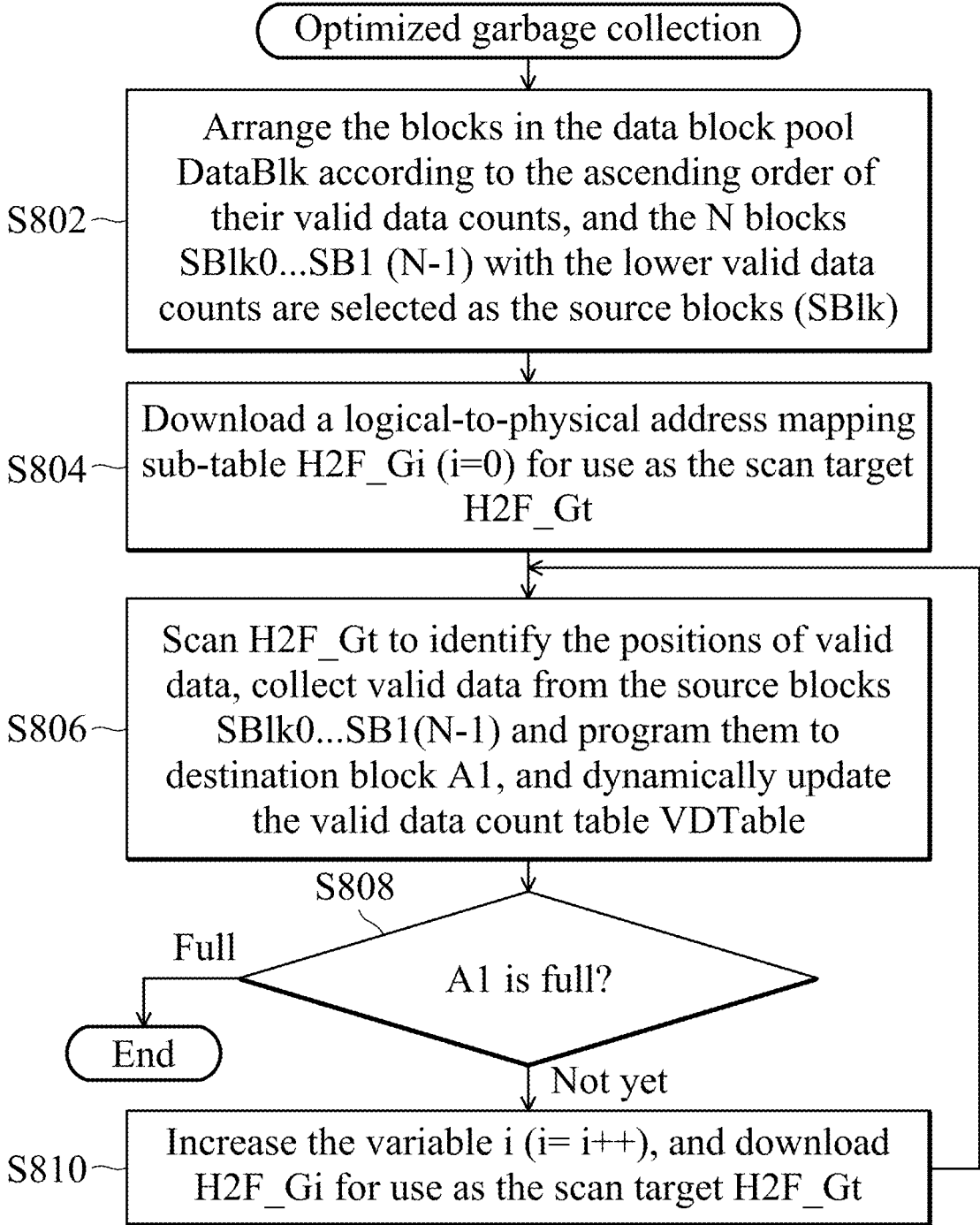
FIG. 8 is a flow chart illustrating an optimized garbage collection procedure in accordance with an exemplary embodiment of the disclosure.

FIG. 8 is a flow chart illustrating an optimized garbage collection procedure in accordance with an exemplary embodiment of the disclosure.

In step S802, the blocks in the data block pool DataBlk are arranged according to the ascending order of their valid data counts, and the N blocks SBlk0 . . . SB1 (N−1) with the lowest valid data counts are selected as the source blocks (SBlk).

Step S804 downloads a logical-to-physical address mapping sub-table H2F_Gi (i=0) for use as the scan target H2F_Gt.

Step S806 scans the scan target H2F_Gt to identify the positions of valid data, collects valid data from the source blocks SBlk0 . . . SB1(N−1) and programs them to the destination block A1, and dynamically updates the valid data count table VDTable.

Step S808 determines whether the destination block A1 is full. If yes, the procedure ends. If not, the procedure proceeds to step S810 to increase the variable i (i=i++), and downloads the logical-to-physical address mapping sub-table H2F_Gi for use as the scan target H2F_Gt, and then proceeds to step S806 again to scan the new scan target H2F_Gt.

As for the optimized garbage collection procedure that is performed on the ranked primary clearing blocks SBlk0 . . . SBlki and secondary clearing blocks SBlk(i+1) . . . SB1(N−1), please refer to FIG. 6.

The aforementioned garbage collection concept may be implemented as a flash memory control method.

Referring to the architecture of FIG. 4, a flash memory control method includes the following steps: selecting a starting source block SBlk0 and a destination block A1 from a flash memory 402 for garbage collection; and starting valid data determination from the starting source block SBlk0. A first logical-to-physical address mapping sub-table H2F_Ga corresponding to the first valid data VD1 in the starting source block SBlk0 is selected as a scan target H2F_Gt for a full scan. A full scan of the scan target H2F_Gt is performed to identify the positions of valid data, and the identified valid data in the source blocks SBlk0 . . . SBlk (N−1) are collected and programmed to the destination block A1. The source blocks SBlk0 . . . SBlk(N−1) may be further ranked into primary clearing blocks SBlk0 . . . SBlki and secondary clearing blocks SBlk(i+1) . . . SB1(N−1). The garbage collection of the primary clearing blocks SBlk0 . . . SBlki has the higher priority than the garbage collection of the secondary clearing blocks SBlk(i+1) . . . SB1(N−1). The details of the method may be coded into a computer program product, to be executed by the processor 410.

Referring to the architecture of FIG. 7, a flash memory control method includes managing a plurality of logical-to-physical address mapping sub-tables H2F_G0 . . . H2F_G (M−1) to represent the space utilization of a flash memory 402. The method includes selecting source blocks SBlk0 . . . SBlk(N−1) and a destination block A1 from a flash memory 402 for garbage collection. The method includes selecting the logical-to-physical address mapping sub-tables H2F_G0 . . . H2F_G(M−1) in turn, in order from the lowest to the highest logical address groups G0 . . . G(M−1) for use as the scan target H2F_Gt to find valid data from the source blocks SBlk0 . . . SBlk(N−1) using a full scan of the scan target H2F_Gt. The method includes collecting valid data obtained from the source blocks SBlk0 . . . SBlk(N−1) and programming it to the destination block A1. The source blocks SBlk0 . . . SBlk(N−1) may be further ranked into primary clearing blocks SBlk0 . . . SBlki and secondary clearing blocks SBlk(i+1) . . . SB1(N−1). The garbage collection of the primary clearing blocks SBlk0 . . . SBlki has the higher priority than the garbage collection of the secondary clearing blocks SBlk(i+1) . . . SB1(N−1). The details of the method may be coded into a computer program product, to be executed by the processor 410.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A non-volatile memory controller, comprising:
a communication interface, coupled to a non-volatile memory; and
a processor, operating the non-volatile memory through the communication interface,
wherein:
space allocation of the non-volatile memory is presented by a plurality of logical-to-physical address mapping sub-tables;

the processor selects a plurality of source blocks and a destination block from the non-volatile memory for garbage collection; and in order from the lowest to the highest logical address, the processor selects the logical-to-physical address mapping sub-tables in turn for use as a scan target, to perform a full scan of each logical-to-physical address mapping sub-table, and thereby to collect valid data in the source blocks and program the valid data obtained from the source blocks to the destination block;

wherein based on a valid data count of each source block, the processor divides the source blocks into primary clearing blocks and secondary clearing blocks such that a total amount of valid data in the primary clearing blocks does not exceed a spare space size of the destination block; and the processor initializes a residual value according to a difference between the total amount of valid data in the primary clearing blocks and the spare space size, and stops collecting valid data from the secondary clearing blocks in response to the residual value dropping to a threshold value after being decreased during the collection of valid data.

2. The non-volatile memory controller as claimed in claim 1, wherein:

the processor scans the scan target on a mapping management unit basis, to obtain a mapped physical address mapped to a target logical address; and when the mapped physical address leads to one of the source blocks, the processor collects data indicated by the mapped physical address, and programs the collected data to the destination block.

3. The non-volatile memory controller as claimed in claim 1, wherein:

the processor selects N blocks with the lowest valid data counts in the non-volatile memory as the source blocks, where N is a positive integer;

the processor classifies blocks with the lowest valid data counts among the source blocks as the primary clearing blocks, and blocks with the highest valid data counts among the source blocks as the secondary clearing blocks;

the total amount of valid data in the primary clearing blocks does not exceed a tolerance value related to the spare space size; and the threshold value for judging the residual value is 0.

4. The non-volatile memory controller as claimed in claim 1, wherein:

when collecting valid data of the source blocks and programming the collected valid data to the destination block, the processor decreases valid data counts of the corresponding source blocks; and the processor excludes blocks with zero valid data from the source blocks.

5. A method for controlling a non-volatile memory, comprising:

managing a plurality of logical-to-physical address mapping sub-tables to present space allocation of the non-volatile memory;

selecting a plurality of source blocks and a destination block from the non-volatile memory for garbage collection;

in order from low to high logical address, selecting the logical-to-physical address mapping sub-tables as a scan target in turn, to perform a full scan of each logical-to-physical address mapping sub-table, and thereby to identify valid data in the source blocks and collect the valid data obtained from the source blocks and programs the collected valid data to the destination block;

dividing the source blocks into primary clearing blocks and secondary clearing blocks based on a valid data count of each source block such that a total amount of valid data in the primary clearing blocks does not exceed a spare space size of the destination block;

initializing a residual value according to a difference between the total amount of valid data in the primary clearing blocks and the spare space size;

decreasing the residual value in response to collecting valid data from the secondary clearing blocks and programming the collected valid data to the destination block; and stopping collecting valid data of the secondary clearing blocks to the destination block in response to the residual value dropping to a threshold value.

6. The method as claimed in claim 5, further comprising:

scanning the scan target on a mapping management unit basis, to obtain a mapped physical address mapped to a target logical address; and when the mapped physical address leads to one of the source blocks, collecting data indicated by the mapped physical address to the destination block.

7. The method as claimed in claim 5, further comprising:

selecting N blocks with the lowest valid data counts in the non-volatile memory as the source blocks, where N is a positive integer; and classifying blocks with the lowest valid data counts among the source blocks as the primary clearing blocks, and blocks with the highest valid data counts among the source blocks as the secondary clearing blocks;

wherein:

the total amount of valid data in the primary clearing blocks does not exceed a tolerance value related to the spare space size; and the threshold value for judging the residual value is 0.

8. The method as claimed in claim 5, further comprising:

when collecting valid data of the source blocks and programming the collected valid data to the destination block, decreasing valid data counts of the corresponding source blocks; and excluding blocks with zero valid data from the source blocks.

9. A non-transitory computer-readable storage medium, storing program code to be executed by a processor to implement the method as claimed claim 5.

10. A non-transitory computer-readable storage medium, storing program code to be executed by a processor to implement the method as claimed in claim 6.

11. A non-transitory computer-readable storage medium, storing program code to be executed by a processor to implement the method as claimed in claim 7.

* * * * *